(12) United States Patent
Kim et al.

(10) Patent No.: US 8,269,735 B2
(45) Date of Patent: Sep. 18, 2012

(54) TOUCH SCREEN DISPLAY

(75) Inventors: Kang-Woo Kim, Seoul (KR); Dong-Gi Seong, Seongnam-si (KR); Yeon-Mun Jeon, Iksan-si (KR); Hee-Hwan Lee, Busan (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 692 days.

(21) Appl. No.: 12/466,740

(22) Filed: May 15, 2009

(65) Prior Publication Data

US 2010/0053115 A1 Mar. 4, 2010

(30) Foreign Application Priority Data

Aug. 26, 2008 (KR) ........................ 10-2008-0083408

(51) Int. Cl.
*G09G 5/00* (2006.01)
*G09G 3/38* (2006.01)
(52) U.S. Cl. ......................................... 345/173; 349/38
(58) Field of Classification Search .................. 345/173; 349/38
See application file for complete search history.

(56) References Cited

U.S. PATENT DOCUMENTS

| 6,046,790 | A | * | 4/2000 | Hara et al. ..................... 349/172 |
| 7,675,665 | B2 | * | 3/2010 | Hagood et al. ................ 359/233 |
| 7,888,150 | B2 | * | 2/2011 | Kim et al. ...................... 438/30 |
| 2007/0070047 | A1 | * | 3/2007 | Jeon et al. ..................... 345/173 |

FOREIGN PATENT DOCUMENTS

| JP | 2003-043497 | 2/2003 |
| KR | 1020050052731 | 6/2005 |
| KR | 1020070082757 | 8/2007 |
| KR | 1020080035808 | 4/2008 |

* cited by examiner

*Primary Examiner* — Quan-Zhen Wang
*Assistant Examiner* — Michael J Eurice
(74) *Attorney, Agent, or Firm* — F. Chau & Associates, LLC.

(57) ABSTRACT

A touch screen display apparatus includes a first substrate and a second substrate facing each other, a conductive pad formed on the first substrate, a cell-gap spacer interposed between the first substrate and the second substrate, an auxiliary cell-gap spacer disposed around the cell-gap spacer, and a conductive spacer formed on the second substrate to correspond to the conductive pad, wherein the conductive spacer is movably connected to the conductive pad.

20 Claims, 10 Drawing Sheets

TOUCH SCREEN DISPLAY

CROSS-REFERENCE TO RELATED APPLICATION

This application claims priority from Korean Patent Application No. 10-2008-0083408 filed on Aug. 26, 2008, the disclosure of which is incorporated herein by reference in its entirety.

BACKGROUND OF THE INVENTION

1. Technical Field

The present disclosure relates to a touch screen display, and more particularly, to a touch screen display without a separate touch panel.

2. Discussion of the Related Art

A touch screen display is used in personal digital assistants (PDAs), satellite navigation devices, and mobile communication devices such as a mobile phone. The touch screen display includes a liquid crystal panel which displays image information, a touch panel which is attached to the liquid crystal panel, a controller, a device driver and application software.

The liquid crystal panel includes a common electrode display panel having a common electrode and a thin-film transistor (TFT) display panel having a TFT array. The common electrode display panel and the TFT display panel face each other and are joined with each other by a seal line. The seal line is interposed between the common electrode display panel and the TFT display panel. A liquid crystal layer is formed in a gap between the common electrode display panel and the TFT display panel.

The liquid crystal panel displays an image when a voltage is applied to the electrodes disposed in the liquid crystal panel. The applied voltage rearranges liquid crystal molecules of the liquid crystal layer, thereby adjusting the amount of light that passes through the liquid crystal layer.

Since the liquid crystal panel is a non-light-emitting device, a backlight unit, which provides light, is disposed behind the TFT display panel. When light emitted from the backlight unit passes through the liquid crystal layer, the transmittance of the light is determined by the arrangement of liquid crystal molecules.

The touch panel includes two substrates which face each other, upper and lower conductive layers which are respectively formed on the two substrates, and a plurality of auxiliary spacers which are interposed between the upper and lower conductive layers. When a user presses a first point on the touch panel using a finger or a pen, the upper conductive layer and the lower conductive layer contact each other at the first point. The upper conductive layer and the lower conductive layer are electrically connected to each other at the first point. Accordingly, the location information of the first point is detected.

However, in a conventional touch screen display, a separate touch panel is attached to the touch screen display. The separate touch panel increases a thickness of the touch screen display. Without the separate touch panel, manufacture time and cost of the touch screen display can be reduced.

SUMMARY OF THE INVENTION

According to an exemplary embodiment of the present invention, a touch screen display apparatus comprises a first substrate and a second substrate facing each other, a conductive pad formed on the first substrate, a cell-gap spacer interposed between the first substrate and the second substrate, an auxiliary cell-gap spacer disposed around the cell-gap spacer, and a conductive spacer formed on the second substrate to correspond to the conductive pad, wherein the conductive spacer is movably connected to the conductive pad.

The auxiliary cell-gap spacer can be covered by a conductive cover portion.

The cell-gap spacer may comprise a first support portion formed on the second substrate, and a second support portion formed on the first support portion.

The auxiliary cell-gap spacer may comprise a third support portion formed on the second substrate, and the conductive cover portion which completely covers the third support portion.

The second support portion and the third support portion may comprise a same material and are formed simultaneously.

The conductive spacer may comprise a fourth support portion formed on the second substrate, and a conductive contact portion formed on the fourth support portion.

The first support portion and the fourth support portion may comprise a same material and are formed simultaneously.

The conductive contact portion may completely cover the fourth support portion.

The conductive contact portion can be formed on a top surface of the fourth support portion.

The cell-gap spacer may comprise a single layer.

The auxiliary cell-gap spacer may comprise a third support portion formed on the second substrate, and the conductive cover portion which completely covers the third support portion.

The conductive spacer may comprise a fourth support portion formed on the second substrate, and a conductive contact portion formed on the fourth support portion.

The third support portion and the fourth support portion may comprise a same material and are formed simultaneously.

The conductive contact portion may completely cover the fourth support portion.

The conductive contact portion can be formed on a top surface of the fourth support portion.

A height of the auxiliary cell-gap spacer can be less than that of the cell-gap spacer.

The conductive cover portion may comprise metal or metal oxide.

According to an exemplary embodiment of the present invention, a touch screen display apparatus comprises a first substrate and a second substrate facing each other, a gate line and a first sensing line extending parallel to each other on the first substrate, a data line and a second sensing line crossing the gate line and the first sensing line and extending parallel to each other, a first conductive pad and a second conductive pad respectively connected to the first sensing line and the second sensing line, a cell-gap spacer interposed between the first substrate and the second substrate, an auxiliary cell-gap spacer formed on the second substrate, and a conductive spacer formed on the second substrate to correspond to the first and second conductive pads, wherein the conductive spacer is movably connected to the first and second conductive pads.

The auxiliary cell-gap spacer can be shorter than the cell gap spacer.

The auxiliary cell-gap spacer can be covered by a conductive cover portion.

The cell-gap spacer may comprise a first support portion formed on the second substrate, and a second support portion formed on the first support portion.

The auxiliary cell-gap spacer may comprise a third support portion formed on the second substrate, and the conductive cover portion which completely covers the third support portion.

The conductive spacer may comprise a fourth support portion formed on the second substrate, and a conductive contact portion formed on the fourth support portion.

The cell-gap spacer may comprise a single layer.

The auxiliary cell-gap spacer may comprise a third support portion formed on the second substrate, and the conductive cover portion which completely covers the third support portion.

The conductive spacer may comprise a fourth support portion formed on the second substrate, and a conductive contact portion formed on the fourth support portion.

BRIEF DESCRIPTION OF THE DRAWINGS

Exemplary embodiments of the present invention can be understood in more detail from the following descriptions taken in conjunction with the accompanying drawings, in which.

DESCRIPTION OF EXEMPLARY EMBODIMENTS

The present invention will now be described more fully with reference to the accompanying drawings in which exemplary embodiments of the invention are shown. The present invention may, however, be embodied in many different forms and should not be construed as being limited to the embodiments set forth herein.

It will be understood that when an element or layer is referred to as being "on" another element or layer, the element or layer can be directly on another element or layer or intervening elements or layers.

A touch screen display according to an exemplary embodiment of the present invention is described with reference to FIGS. 1 through 3B. The touch screen display includes a lower display panel having a thin-film transistor (TFT) array, an upper display panel facing the lower display panel, and a liquid crystal layer interposed between the lower and upper display panels.

Referring to FIGS. 1 through 3B, the touch screen display includes a lower display panel 100, an upper display panel 200 which faces the lower display panel 100, and a liquid crystal layer 300 which is interposed between the lower display panel 100 and the upper display panel 200. The touch screen display includes a plurality of unit dots 10 which are arranged in a matrix. Each of the unit dots 10 includes three pixels, for example, a red (R) pixel 11, a green (G) pixel 12, and a blue (B) pixel 13. A cell-gap spacer 20, at least one auxiliary spacer 30 disposed around the cell-gap spacer 20, and a conductive spacer 40 are formed in each of the unit dots 10 and on the upper display panel 200.

Figure 1:
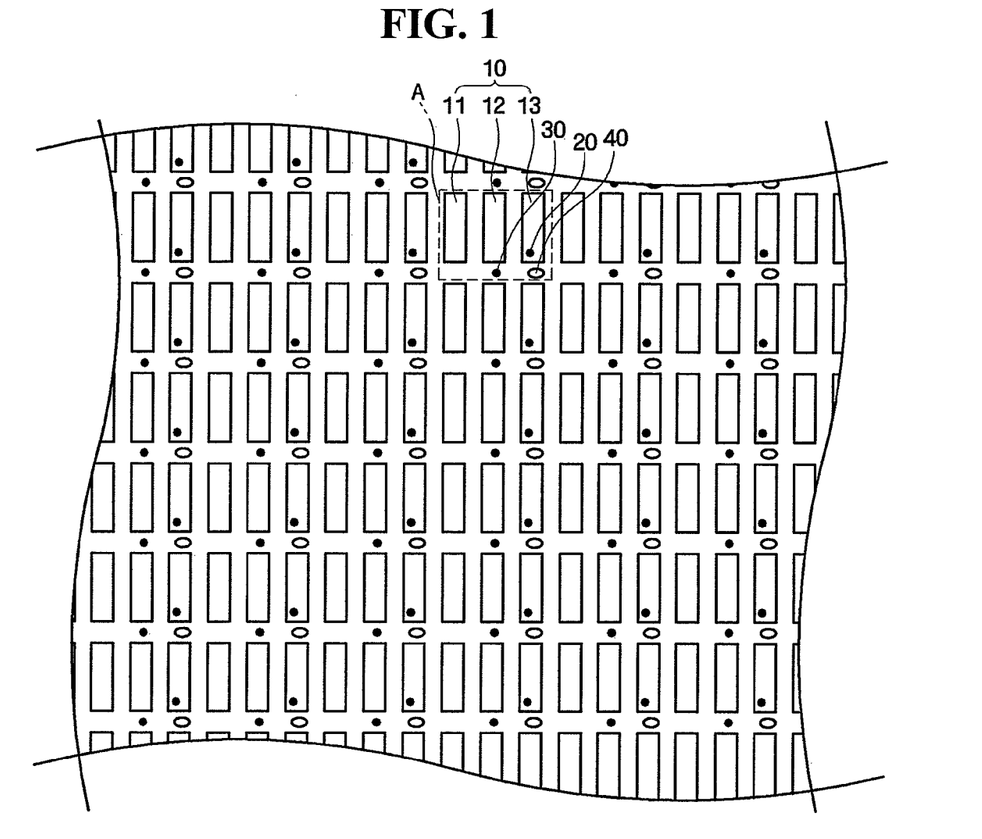
FIG. 1 is a schematic plan view of a touch screen display according to an exemplary embodiment of the present invention.
Figure 2:
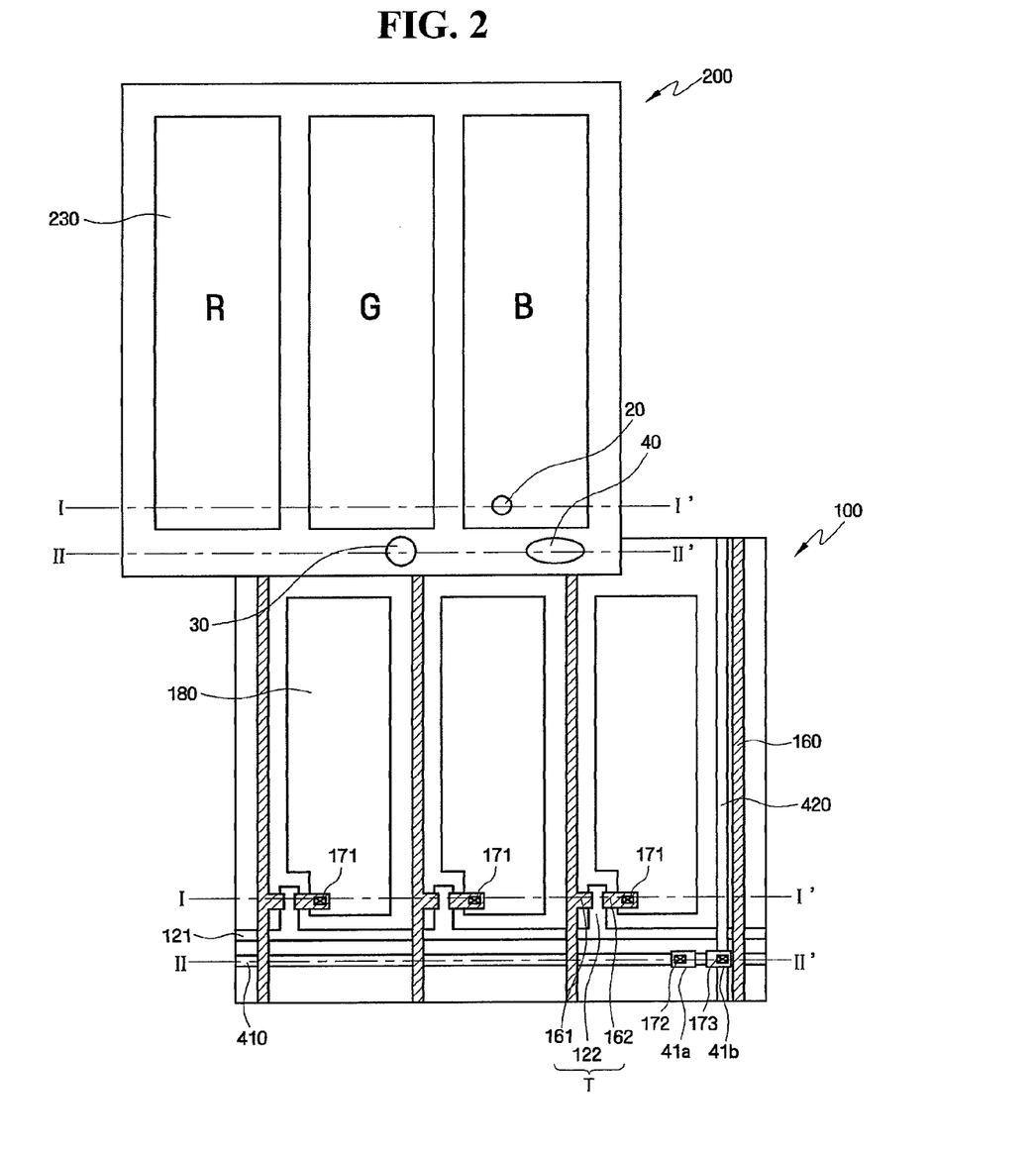
FIG. 2 is an enlarged plan view of a portion A of the touch screen display of FIG. 1 according to an exemplary embodiment of the present invention.
Figure 3A:
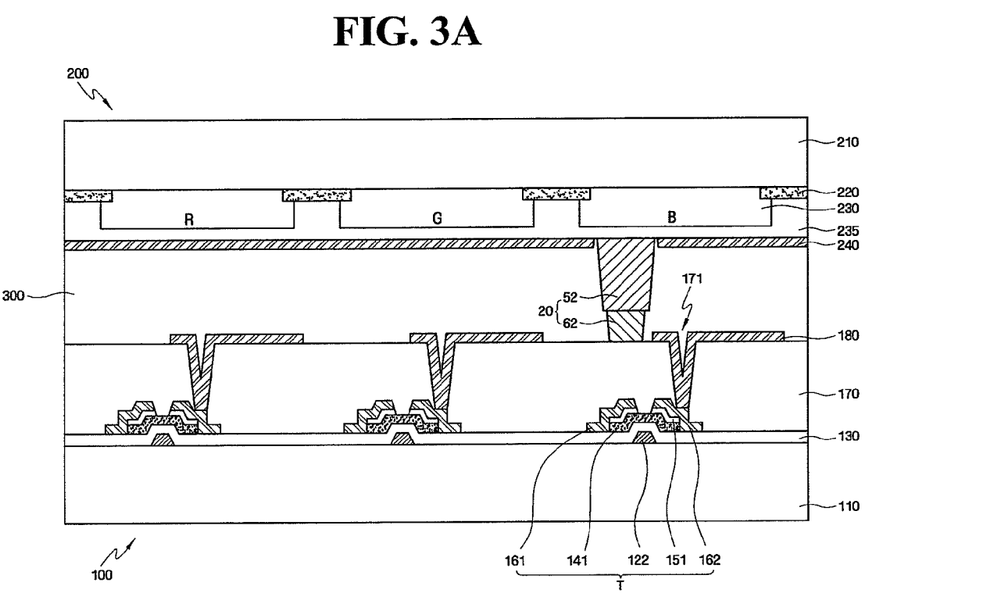
FIG. 3A is a cross-sectional view of a touch screen display taken along the line I-I' of FIG. 2 according to an exemplary embodiment of the present invention.
Figure 3B:
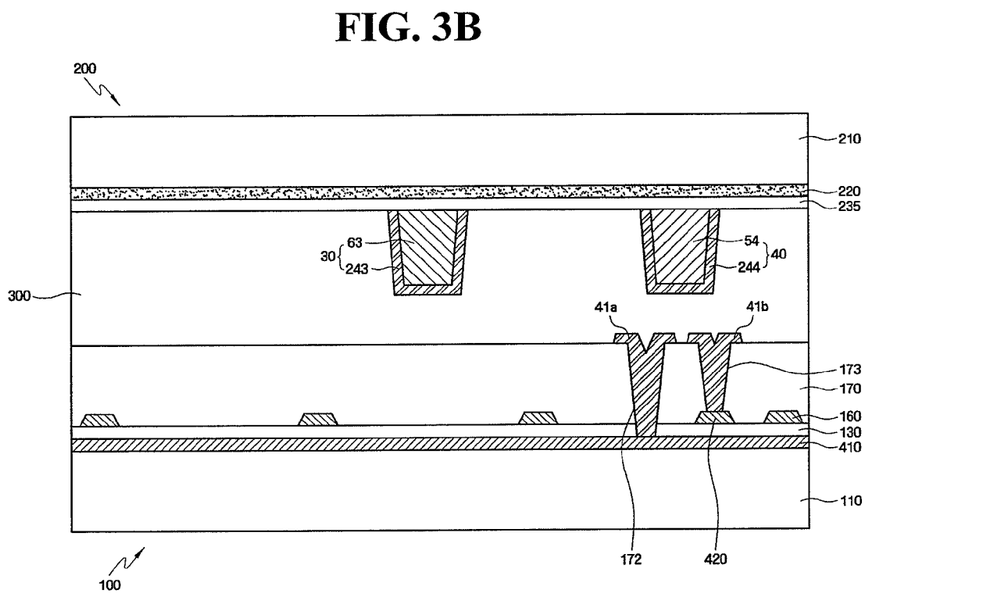
FIG. 3B is a cross-sectional view of a touch screen display taken along the line II-II' of FIG. 2 according to an exemplary embodiment of the present invention.

Referring to the lower display panel 100, a gate line 121 and a gate electrode 122 are formed on an insulating substrate 110. The gate line 121 extends horizontally, and the gate electrode 122 protrudes from the gate line 121. Gate wiring includes the gate line 121 and the gate electrode 122.

A first sensing line 410 is formed on the insulating substrate 110. The first sensing line 410 is separated from the gate line 121 and extends horizontally. The first sensing line 410 is connected to a first conductive pad 41a, which is a terminal of a touch screen sensor, through a contact hole 172. When touch pressure is applied to a first point on the touch screen display, the first sensing line 410 is electrically connected to the conductive spacer 40. As such, the location of the first point is detected.

Each of the gate wiring and the first sensing line 410 may comprise, for example, aluminum (Al)-based metal such as Al or Al alloy, silver (Ag)-based metal such as Ag or Ag alloy, copper (Cu)-based metal such as Cu or Cu alloy, molybdenum (Mo)-based metal such as Mo or Mo alloy, chrome (Cr), titanium (Ti), or tantalum (Ta). Each of the gate wiring and the first sensing line 410 may have a multi-layer structure comprising two conductive layers with different physical characteristics. In an exemplary embodiment, a first layer of the two conductive layers may comprise metal with low resistivity, such as Al-based metal, Ag-based metal or Cu-based metal, to reduce signal delay or voltage drop of each of the gate wiring and the first sensing line 410. A second layer of the two conductive layers may comprise a material having good contact characteristics with indium tin oxide (ITO) and indium zinc oxide (IZO). For example, Mo-based metal, Cr, Ti, or Ta can be used as the second layer. Examples of the multi-layer structure include a combination of a Cr lower layer and an Al upper layer and a combination of an Al lower layer and a Mo upper layer.

A gate insulating film 130, which comprises silicon oxide (SiO$_2$) or silicon nitride (SiNx), is formed on the gate wiring and the first sensing line 410.

A semiconductor layer 141, which comprises hydrogenated amorphous silicon or polycrystalline silicon, is formed on the gate insulating film 130. The semiconductor layer 141 may have, for example, an island or linear shape. The semiconductor layer 141 may be disposed above the gate electrode 122 when the semiconductor layer 141 has an island shape according to an exemplary embodiment of the present invention. Alternatively, the semiconductor layer 141 may be disposed under a data line 160 and may extend onto the gate electrode 122 when the semiconductor layer 141 has a linear shape. When the semiconductor layer 141 has the linear shape, the semiconductor layer 141 may be patterned to have substantially the same pattern as the data line 160.

The semiconductor layer 141 may comprise, for example, an oxide such as ZnO, InZnO, InGaO, InSnO, ZnSnO, GaSnO, GaZnO, GaZnSnO or GaInZnO having good ohmic contact characteristics between the semiconductor layer 141 and a source electrode 161 and a drain electrode 162. Thus, an ohmic contact layer can be omitted.

An ohmic contact layer 151 can be formed on the semiconductor layer 141 according to an exemplary embodiment of the present invention. The ohmic contact layer 151 comprises silicide or n+ hydrogenated amorphous silicon which is doped with n-type impurities with high concentration. The ohmic contact layer 151 may have an island or linear shape. When the ohmic contact layer 151 has an island shape, the ohmic contact layer 151 may be disposed under the drain electrode 162 and the source electrode 161 according to an exemplary embodiment of the present invention. When the ohmic contact layer 151 has a linear shape, the ohmic contact layer 151 may extend up to under the data line 160. The ohmic contact layer 151 is separated into two portions by a channel region between the source electrode 161 and the drain electrode 162.

The data line 160 and the drain electrode 162 are formed on the ohmic contact layer 151 and the gate insulating film 130. The data line 160 extends vertically and crosses the gate line 121. The source electrode 161 branches off from the data line 160 and extends onto the semiconductor layer 141. The drain electrode 162 is separated from the source electrode 161 and is formed on the semiconductor layer 141 to face the source electrode 161 with respect to the gate electrode 122. Data wiring includes the data line 160, the source electrode 161, and the drain electrode 162.

A thin-film transistor (TFT) T is a three-terminal device comprising the gate electrode 122, the source electrode 161 and the drain electrode 162. The TFT T is a switching device controlling the flow of electric current between the source electrode 161 and the drain electrode 162 when a voltage is applied to the gate electrode 122.

A second sensing line 420 is formed on the gate insulating film 130. The second sensing line 420 is separated from the data line 160 and extends vertically. The second sensing line 420 is connected to a second conductive pad 41b, which is a terminal of the touch screen sensor, through a contact hole 173. When touch pressure is applied to the first point on the touch screen display, the second sensing line 420 is electrically connected to the conductive spacer 40, and thus location of the first point is detected.

The first sensing line 410 provides a horizontal coordinate of the first point, and the second sensing line 420 provides a vertical coordinate of the first point. The second sensing line 420 may be formed between the B pixel 13 and the R pixel 11. In an exemplary embodiment, the second sensing line 420 is formed on the side of the B pixel 13 adjacent to the data line 160.

Each of the data wiring and the second sensing line 420 may include a single layer or multiple layers comprising one or more of Al, Cr, Mo, Ta, and Ti. For example, each of the data wiring and the second sensing line 420 may comprise a refractory metal such as Cr, Mo-based metal, Ta, or Ti. In an exemplary embodiment, each of the data wiring and the second sensing line 420 may have a multi-layer structure including a lower layer comprising a refractory metal, and an upper layer comprising a material with low resistivity. The multi-layer structure may be a double-layer structure comprising a combination of a Cr lower layer and an Al upper layer or a combination of an Al lower layer and a Mo upper layer. In an exemplary embodiment, the multi-layer structure may be a triple-layer structure comprising Mo—Al—Mo layers.

The source electrode 161 overlaps at least a part of the semiconductor layer 141. The drain electrode 162 overlaps at least a part of the semiconductor layer 141 to face the source electrode 161 with respect to the gate electrode 122. The ohmic contact layer 151 reduces contact resistance between the semiconductor layer 141 and the source electrode 161 and between the semiconductor layer 141 and the drain electrode 162.

A passivation layer 170 is formed on the data wiring (i.e., the data line 160, the source electrode 161, and the drain electrode 162) and an exposed portion of the semiconductor layer 141. The passivation layer 170 may comprise, for example, an inorganic material such as SiO$_2$ or SiNx, an organic material having photosensitivity and good planarization characteristics, or a low-k dielectric material formed by a plasma enhanced chemical vapor deposition (PECVD), such as a-Si:C:O or a-Si:O:F. When the passivation layer 170 comprises an organic material, the passivation layer 170 may have a double-layer structure including a lower inorganic layer and an upper organic layer to prevent the organic material from contacting the exposed portion of the semiconductor layer 141 between the source electrode 161 and the drain electrode 162. An R, G or B filter may be used as the passivation layer 170.

The contact holes 171 and 173, which respectively expose the drain electrode 162 and the second sensing line 420, are formed in the passivation layer 170. The contact hole 172, which exposes the first sensing line 410, is formed in the passivation layer 170 and the gate insulating film 130. A pixel electrode 180 is formed on the passivation layer 170. The pixel electrode 180 is electrically connected to the drain electrode 162 through the contact hole 171. When a data voltage is applied to the pixel electrode 180, the pixel electrode 180 generates an electric field together with a common electrode 240 of the upper display panel 200, thereby arranging liquid crystal molecules of the liquid crystal layer 300 between the pixel electrode 180 and the common electrode 240.

The first conductive pad 41a and the second conductive pad 41b are formed on the passivation layer 170. The first and second conductive pads 41a and 41b are respectively connected to the first sensing line 410 and the second sensing line 420 through the contact holes 172 and 173. The first conductive pad 41a and the second conductive pad 41b may be formed in a region where the first sensing line 410 and the second sensing line 420 cross each other.

Each of the pixel electrode 180, the first conductive pad 41a and the second conductive pad 41b may comprise, for example, a transparent conductor, such as ITO or IZO, or a reflective conductor such as Al. In an exemplary embodiment, an alignment layer, which can align the liquid crystal layer 300, may be coated on the pixel electrode 180, the first conductive pad 41a, the second conductive pad 41b, and the passivation layer 170.

Referring to the upper display panel 200, a black matrix 220 is formed on an insulating substrate 210 comprising, for example, transparent glass. The black matrix 220 prevents leakage of light and defines pixel regions. The black matrix 220 may be formed in a region corresponding to the gate line 121, a region corresponding to the data line 160, and a region corresponding to the TFT T. The black matrix 220 may be formed on the lower display panel 100 according to an exemplary embodiment of the present invention. The black matrix 220 may comprise metal or metal oxide, such as Cr or Cr oxide, or organic black resist such as carbon black.

R, G and B filters 230 may be sequentially and respectively arranged in pixel regions which correspond to holes in the black matrix 220. The R, G and B color filters 230 may be formed on the lower display panel 100. For planarization, an overcoat layer 235 may be formed on the R, G and B color filters 230. The overcoat layer 235 may be omitted in an exemplary embodiment of the present invention.

The common electrode 240, the cell-gap spacer 20, the auxiliary cell-gap spacer 30, and the conductive spacer 40 are formed on the overcoat layer 235. The common electrode 240 may comprise, for example, a transparent conductive material such as ITO or IZO. The alignment layer, which aligns the liquid crystal molecules, may be coated on the common electrode 240.

When the distance between the lower display panel 100 and the upper display panel 200 is defined as a cell gap, the cell-gap spacer 20 is interposed between the lower display panel 100 and the upper display panel 200 to maintain the cell gap. The cell-gap spacer 20 includes a first support portion 52 which is formed on the overcoat layer 235 and a second support portion 62 which is formed on the first support portion 52. The height of the first support portion 52 may be greater than that of the second support portion 62. The first and second support portions 52 and 62 may comprise photosensitive resin. The first support portion 52 and/or the second support portion 62 may not be covered by the common electrode 240. In an exemplary embodiment, a portion of the cell-gap spacer 20, which contacts the liquid crystal layer 300, may not be covered by the common electrode 240.

The cell-gap spacer 20 may comprise photosensitive resin having elasticity. Thus, even when the touch pressure is repeatedly applied to the touch screen display, the cell gap between the lower display panel 100 and the upper display panel 200 may be maintained due to the elasticity of the cell-gap spacer 20. When the cell-gap spacer 20 is manufactured, if the common electrode 240 covers the first support portion 52 and/or the second support portion 62, the elasticity of the cell-gap spacer 20 is reduced since the elasticity of the common electrode 240 comprising metal or metal oxide is low. Therefore, in an exemplary embodiment, the first support portion 52 and the second support portion 62 of the cell-gap spacer 20 may not be covered by the common electrode 240.

The cell-gap spacer 20 may be disposed in each of the unit dots 10. For example, the cell-gap spacer 20 may be disposed in the B pixel 13. In an exemplary embodiment, the cell-gap spacer 20 may be formed in the R pixel 11 or the G pixel 12. In an exemplary embodiment, the cell-gap spacer 20 may be formed in a region corresponding to the TFT T of the lower display panel 100.

At least one auxiliary cell-gap spacer 30 is formed around the cell-gap spacer 20 to reduce the compression of the cell-gap spacer 20. To prevent a decrease of an aperture ratio of the touch screen display, the auxiliary cell-gap spacer 30 may be formed on the black matrix 220 between the R, G and B pixels 11 through 13. When only one auxiliary cell-gap spacer 30 is formed, the auxiliary cell-gap spacer 30 may be disposed adjacent the cell-gap spacer 20. For example, the auxiliary cell-gap spacer 30 may be formed on a portion of the black matrix 220 between the G pixels 12 of every two adjacent unit dots 10. The auxiliary cell-gap spacer 30 formed on the upper display panel 200 may be shorter than the cell-gap spacer 20 not to contact the lower display panel 100 when a contact pressure is applied thereto.

The auxiliary cell-gap spacer 30 includes a third support portion 63 which is formed on the overcoat layer 235 and a conductive cover portion 243 which completely covers the third support portion 63. The third support portion 63 may comprise substantially the same material as the second support portion 62 of the cell-gap spacer 20. The third support portion 63 and the second support portion 62 may be formed simultaneously in a single process in an exemplary embodiment. When the third support portion 63 and the second support portion 62 are formed simultaneously, the third support portion 63 and the second support portion 62 may be formed to have different heights by using a halftone mask or a slit mask.

The conductive cover portion 243 may comprise substantially the same material as the common electrode 240. In an exemplary embodiment, the conductive cover portion 243 and the common electrode 240 may be formed simultaneously in a single process. The auxiliary cell-gap spacer 30 disperses a compressive force that is applied to the cell-gap spacer 20 and prevents the cell-gap spacer 20 from being excessively compressed. As such, the auxiliary cell-gap spacer 30 according to an exemplary embodiment of the present invention has rigidity and elasticity. Since the conductive cover portion 243 comprising metal or metal oxide covers the third support portion 63, the auxiliary cell-gap spacer 30 can have sufficient rigidity.

The conductive spacer 40 may be disposed in each of the unit dots 10. For example, the conductive spacer 40 is formed on a portion of the black matrix 220 between the B pixels 13 of every two adjacent unit dots 10. The conductive spacer 40 is separated from the cell-gap spacer 20 and the auxiliary cell-gap spacer 30 by predetermined distances, respectively. In an exemplary embodiment, the conductive spacer 40 is formed in a region corresponding to the first conductive pad 41a and the second conductive pad 41b which are formed on the lower display panel 100. The conductive spacer 40 formed on the upper display panel 200 may be shorter than the cell-gap spacer 20 not to contact the lower display panel 100 when no touch pressure is applied.

The conductive spacer 40 includes a fourth support portion 54 which is formed on the overcoat layer 235 and a conductive contact portion 244 which completely covers the fourth support portion 54. That is, the conductive contact portion 244 may be formed on portions of the fourth support portion 54 which are exposed to the liquid crystal layer 300. The fourth support portion 54 may comprise substantially the same material as the first support portion 52 of the cell-gap spacer 20. In an exemplary embodiment, the fourth support portion 54 and the first support portion 52 may be formed simultaneously in a single process. When the fourth support portion 54 and the first support portion 52 are formed simultaneously, the fourth support portion 54 and the first support portion 52 may be formed to have different heights by using a halftone mask or a slit mask.

The conductive contact portion 244 may comprise substantially the same material as the common electrode 240. In an exemplary embodiment, the conductive contact portion 244 and the common electrode 240 may be formed simultaneously in a single process. When no touch pressure is applied, the conductive spacer 40 is separated from the lower display panel 100. When a touch pressure is applied, the conductive contact portion 244 of the conductive spacer 40 contacts the first and second conductive pads 41a and 41b, and thus is electrically connected to the first and second conductive pads 41a and 41b.

A method of forming the upper display panel 200 of the touch screen display according to an exemplary embodiment of the present invention is described with reference to FIGS. 3A through 7B.

Figure 4A:
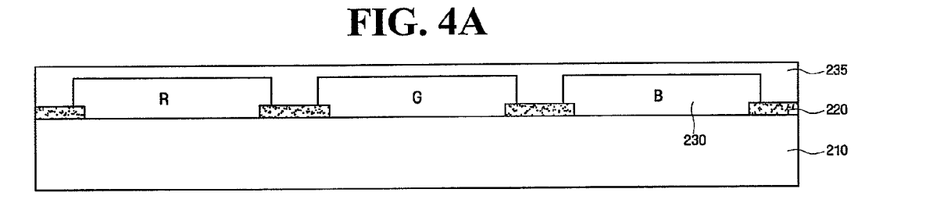
FIGS. 4A, 5A, 6A and 7A are cross-sectional views of the touch screen display apparatus taken along the line I-I' of FIG. 2 showing a method of forming an upper display panel according to an exemplary embodiment of the present invention.
Figure 4B:
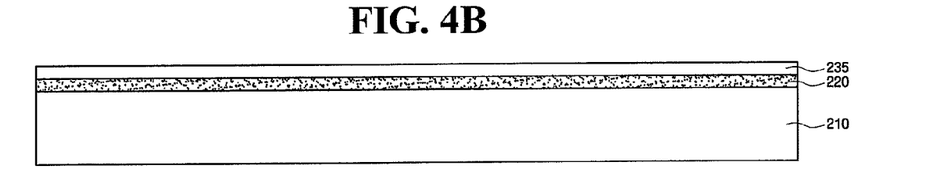
FIGS. 4B, 5B, 6B and 7B are cross-sectional views of the touch screen display apparatus taken along the line II-II' of FIG. 2 showing a method of forming an upper display panel according to an exemplary embodiment of the present invention.

Referring to FIGS. 4A and 4B, the black matrix 220 is formed on the transparent insulating substrate 210 comprising glass, quartz, ceramic or plastic. In an exemplary embodiment, the black matrix 220 may comprise a photosensitive organic material having a black pigment, such as carbon black or titanium oxide. The black matrix 220 is formed in regions where the R, G and B pixels 11 through 13 are not formed. The black matrix 220 partitions a color filter. In an exemplary embodiment, the black matrix 220 blocks light at locations where liquid crystal molecules are difficult to be controlled, thereby improving a contrast ratio of the touch screen display. To planarize the upper substrate 200, the overcoat layer 235 is formed on the black matrix 220. The overcoat layer 235 may be omitted according to an exemplary embodiment of the present invention.

Figure 5A:
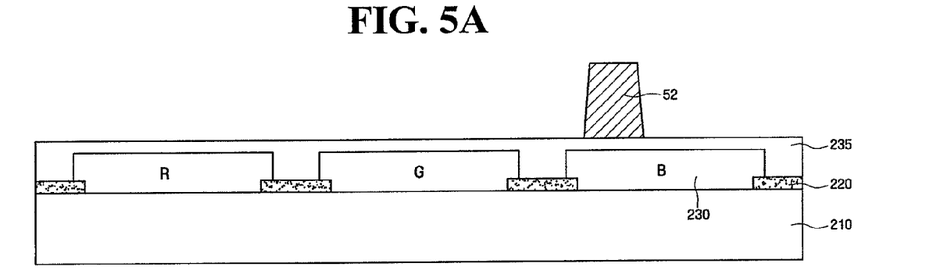
Figure 5B:
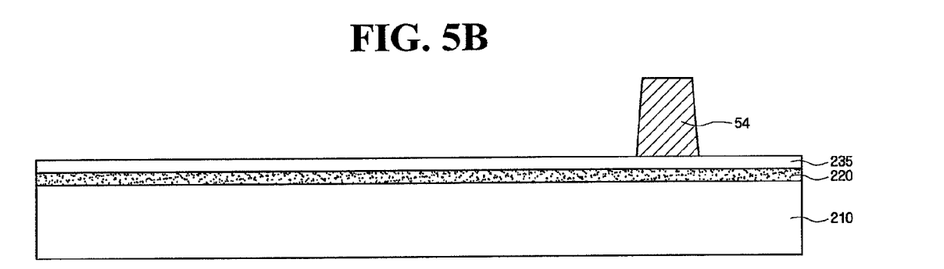

Referring to FIGS. 5A and 5B, the first support portion 52 and the fourth support portion 54 are formed on the overcoat layer 235. To form the first support portion 52 and the fourth support portion 54, an organic insulating film or an inorganic insulating film is formed on a whole surface of the overcoat layer 235, and then a photolithography process and an etching process are performed on the organic or inorganic insulating film. The first support portion 52 may be disposed in each of the unit dots 10. For example, the first support portion 52 may be disposed in the B pixel 13. The fourth support portion 54 may be disposed in each of the unit dots 10. For example, the fourth support portion 54 may overlap a portion of the black matrix 220 between the B pixels 13 of every two adjacent unit dots 10. The height of the first support portion 52 may be equal to or different from that of the fourth support portion 54. When a halftone mask or a slit mask is used to form the first support portion 52 and the fourth support portion 54, the first support portion 52 and the fourth support portion 54 may have different heights.

Figure 6A:
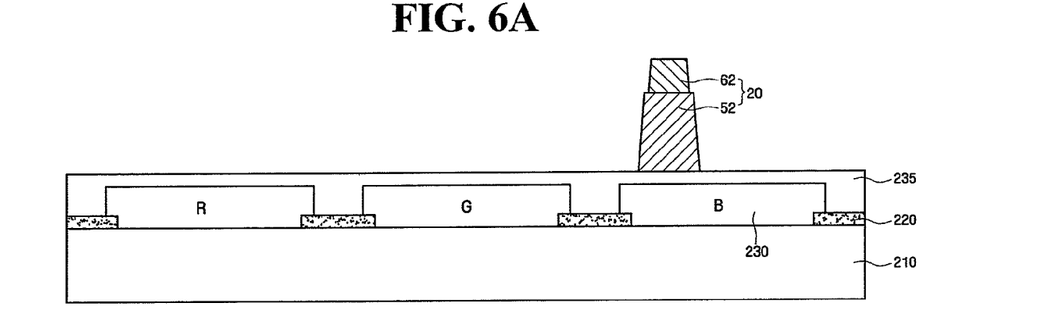
Figure 6B:
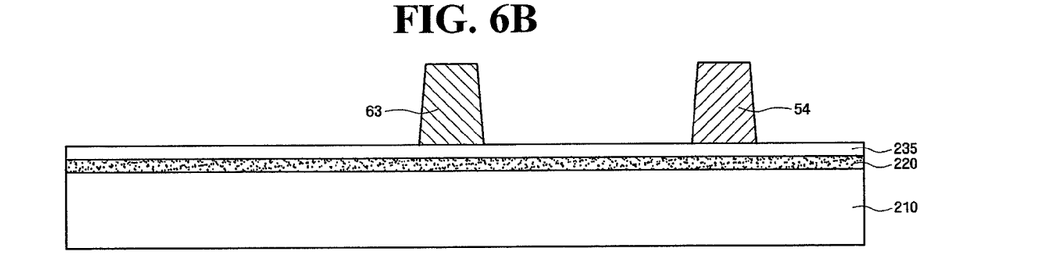

Referring to FIGS. 6A and 6B, the second support portion 62 is formed on the first support portion 52 to form the cell-gap spacer 20. The third support portion 63 is formed on the overcoat layer 235. To form the second support portion 62 and the third support portion 63, an organic insulating film or an inorganic insulating film is formed on the whole surface of the overcoat layer 235, and then a photolithography process and an etching process are performed on the organic or inorganic insulating film. The third support portion 63 is disposed adjacent the first support portion 52. For example, the third support portion 63 may overlap a portion of the black matrix 220 between the G pixels 12 of every two adjacent unit dots 10. The height of the second support portion 62 may be equal to or different from that of the third support portion 63. When a halftone mask or a slit mask is used to form the second support portion 62 and the third support portion 63, the second support portion 62 and the third support portion 63 may have different heights.

Figure 7A:
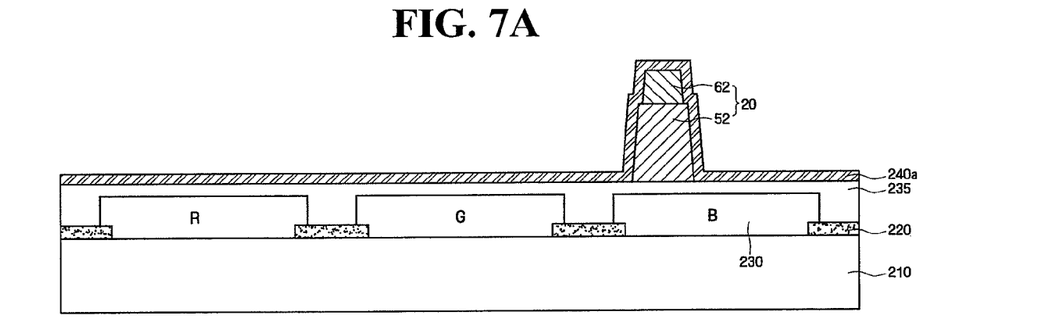
Figure 7B:
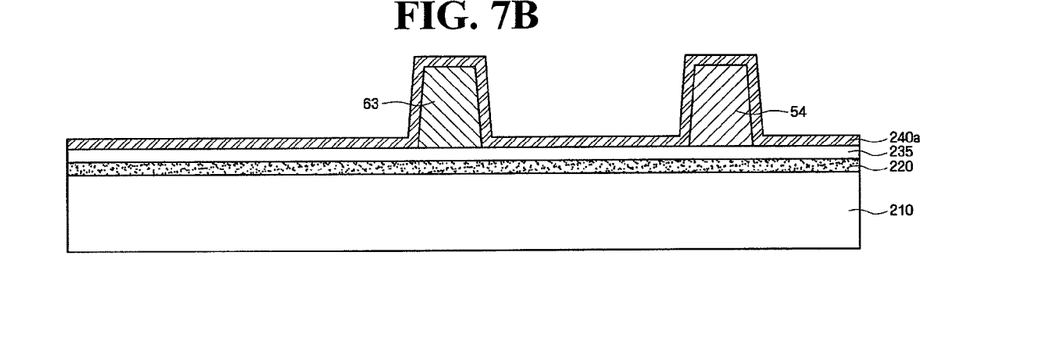

Referring to FIGS. 7A and 7B, a transparent conductive layer 240a is formed on a whole surface of the insulating substrate 210 having the cell-gap spacer 20, the third support portion 63 and the fourth support portion 54 formed thereon.

Referring to FIGS. 3A, 3B, 7A and 7B, the transparent conductive layer 240a is patterned to expose the cell-gap spacer 20. The transparent conductive layer 240a remains on the overcoat layer 235, which corresponds to pixel regions, to form the common electrode 240. Then, the transparent conductive layer 240a is removed except for portions covering the third support portion 63 and the fourth support portion 54.

Figure 8:
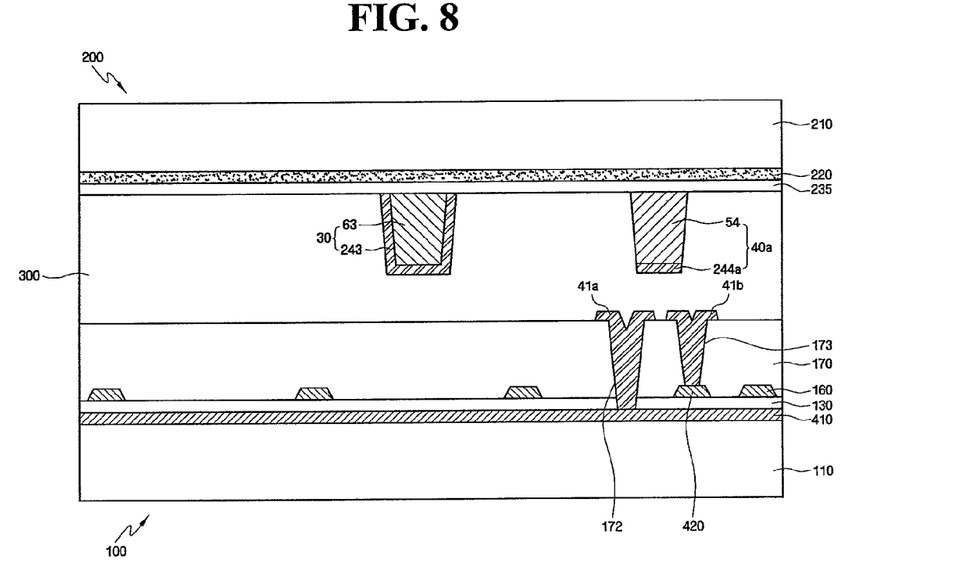
FIG. 8 is a cross-sectional view of a touch screen display according to an exemplary embodiment of the present invention.

A touch screen display according to an exemplary embodiment of the present invention is described with reference to FIG. 8. Referring to FIG. 8, a conductive spacer 40a includes the fourth support portion 54 which is formed on the overcoat layer 235 and a conductive contact portion 244a which is formed on a top surface of the fourth support portion 54. The top surface of the fourth support portion 54 is a surface of the fourth support portion 54 which faces first and second conductive pads 41a and 41b. When the conductive contact portion 244a is formed on the top surface of the fourth support portion 54 instead of completely covering the fourth support portion 54, the elasticity of the conductive spacer 40a can be increased. Since the conductive contact portion 244a is formed on the fourth support portion 54, when the touch pressure is applied, the first and second conductive pads 41a and 41b may be electrically connected to each other through the conductive contact portion 244a.

In an exemplary embodiment, since the conductive contact portion 244a comprises a material having relatively low elasticity, and side surfaces of the fourth support portion 54 are not covered by the conductive contact portion 244a, the elasticity of the fourth support portion 54 can be increased. Therefore, even when the touch pressure is repeatedly applied, the deformation of the conductive spacer 40a can be reduced, which, in turn, increases the sensitivity and reliability of the touch screen display.

A touch screen display according to an exemplary embodiment of the present invention is described with reference to FIGS. 9A and 9B.

Figure 9A:
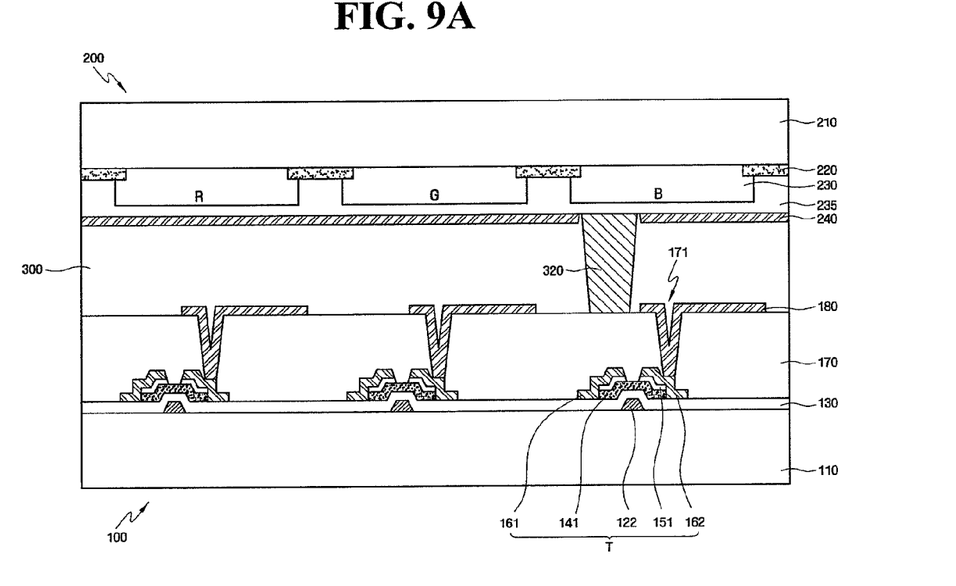
FIG. 9A is a cross-sectional view of a touch screen display according to an exemplary embodiment of the present invention.
Figure 9B:
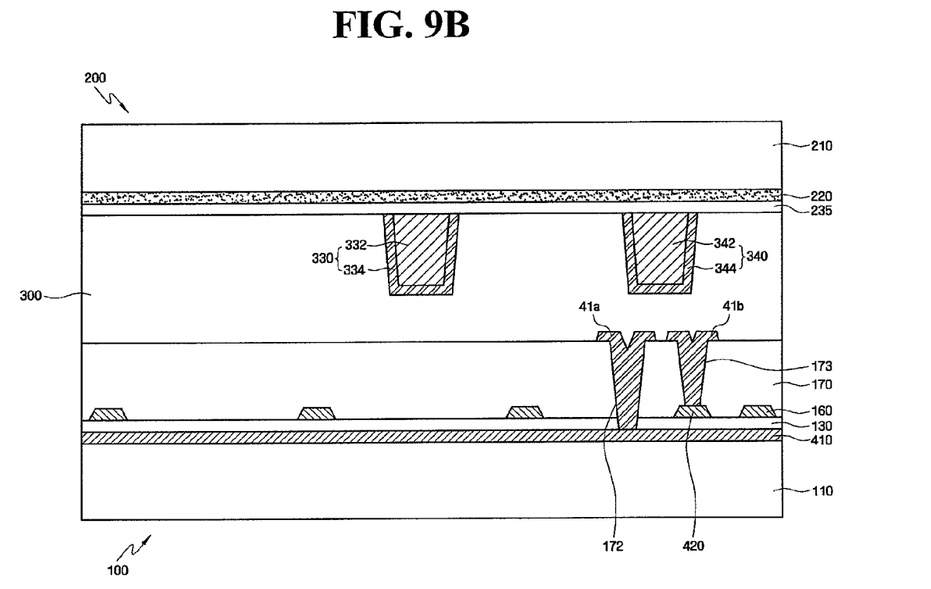
FIG. 9B is a cross-sectional view of a touch screen display according to an exemplary embodiment of the present invention.

Referring to FIGS. 9A and 9B, a cell-gap spacer 320 includes a single layer and interposed between a lower display panel 100 and an upper display panel 200. A common electrode 240 comprising metal or metal oxide has low elasticity. Thus, the cell-gap spacer 320 may not be covered by the common electrode 240 to increase the elasticity of the cell-gap spacer 320.

An auxiliary cell-gap spacer 330 includes a third support portion 332 which is formed on an overcoat layer 235 and a conductive cover portion 334 which completely covers the third support portion 332. A conductive spacer 340 includes a fourth support portion 342 which is formed on the overcoat layer 235 and a conductive contact portion 344 which completely covers the fourth support portion 342. The third support portion 332 may comprise substantially the same material as the fourth support portion 342. In an exemplary embodiment, the third support portion 332 and the fourth support portion 342 may be formed simultaneously in a single process.

The cell-gap spacer 320 may comprise a different material from those of the third and fourth support portions 332 and 342. Alternatively, the cell-gap spacer 320 may comprise substantially the same material as the third and fourth support portions 332 and 342. The conductive cover portion 334 and the conductive contact portion 344 may comprise substantially the same material as the common electrode 240. In an exemplary embodiment, the conductive cover portion 334, the conductive contact portion 344, and the common electrode 240 may be formed simultaneously in a single process.

The auxiliary cell-gap spacer 330 disperses a compressive force that is applied to the cell-gap spacer 320 and prevents the cell-gap spacer 320 from being excessively compressed. As such, the auxiliary cell-gap spacer 330 has rigidity and elasticity. Since the conductive cover portion 334 comprising metal or metal oxide covers the third support portion 332, the auxiliary cell-gap spacer 330 can have sufficient rigidity. A method of forming the upper display panel 200 of the touch screen display according to an exemplary embodiment of the present invention is described with reference to FIGS. 9A through 13B.

Figure 10A:
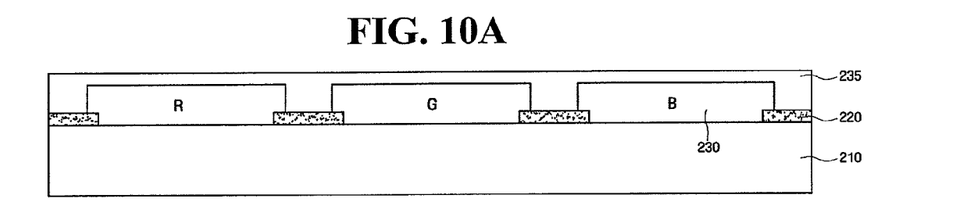
FIGS. 10A, 11A, 12A and 13A are cross-sectional views of the touch screen display apparatus of FIG. 9A showing a method of forming an upper display panel according to an exemplary embodiment of the present invention.
Figure 10B:
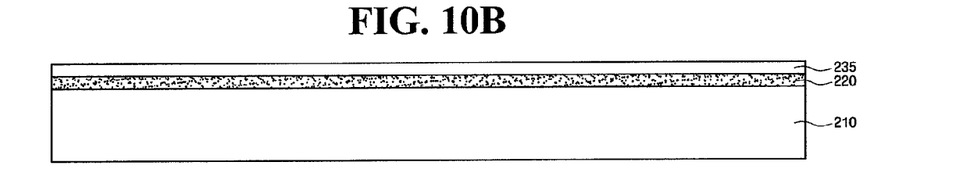
FIGS. 10B, 11B, 12B and 13B are cross-sectional views of the touch screen display apparatus of FIG. 9B showing a method of forming an upper display panel according to an exemplary embodiment of the present invention.

Referring to FIGS. 10A and 10B, a black matrix 220 is formed on a transparent insulating substrate 210 comprising glass, quartz, ceramic or plastic. In an exemplary embodiment, the black matrix 220 may comprise a photosensitive organic material having a black pigment, such as carbon black or titanium oxide.

Figure 11A:
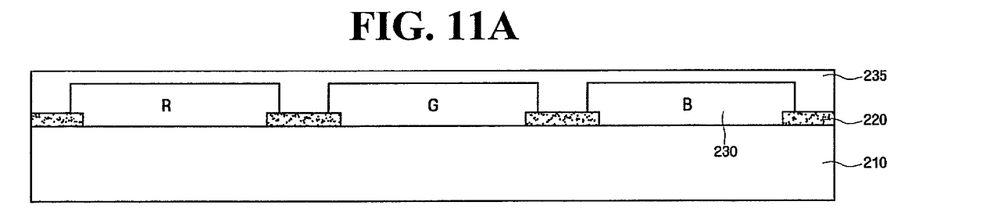
Figures 11B, 12A:
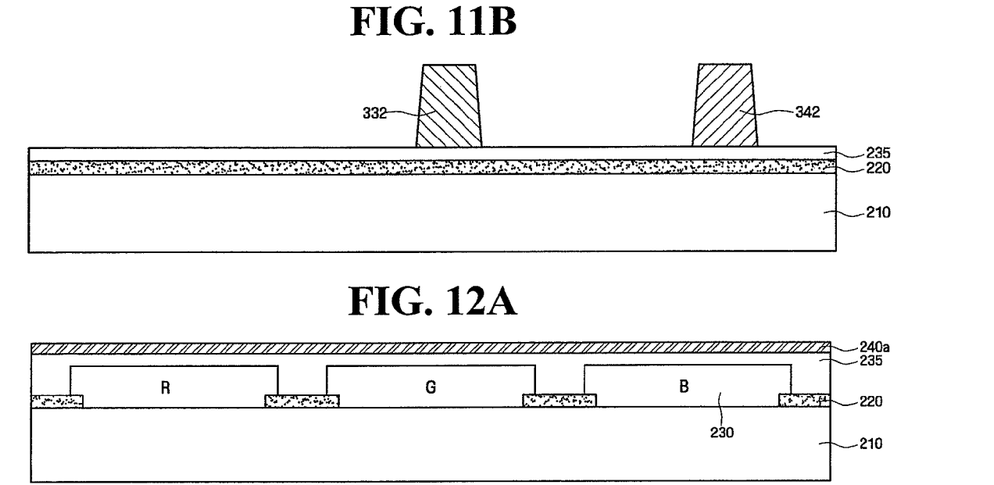

Referring to FIGS. 11A and 11B, the third support portion 332 and the fourth support portion 342 are formed on the overcoat layer 235 to overlap the black matrix 220. To form the third support portion 332 and the fourth support portion 342, an organic insulating film or an inorganic insulating film is formed on a whole surface of the overcoat layer 235, and then a photolithography process and an etching process are performed on the organic or inorganic insulating film. The height of the third support portion 332 may be equal to or different from that of the fourth support portion 342. When a halftone mask or a slit mask is used to form the third support portion 332 and the fourth support portion 342, the third support portion 332 and the fourth support portion 342 may have different heights.

Figure 12B:
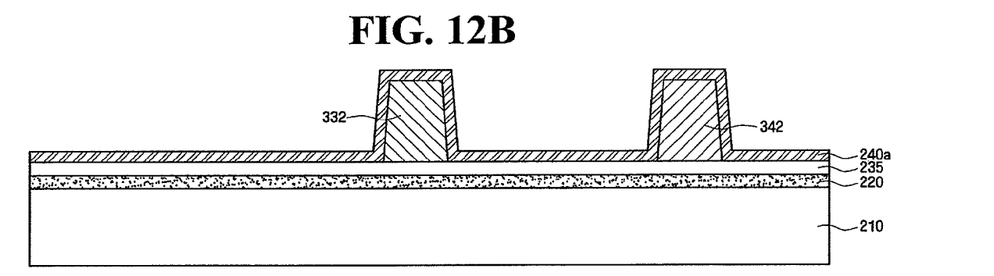

Referring to FIGS. 12A and 12B, the transparent conductive layer 240a is formed on the whole surface of the overcoat layer 235 having the third and fourth support portions 332 and 342 formed thereon.

Figure 13A:
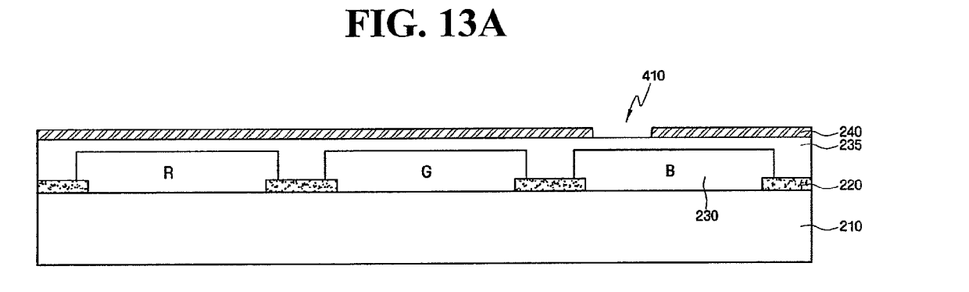
Figure 13B:
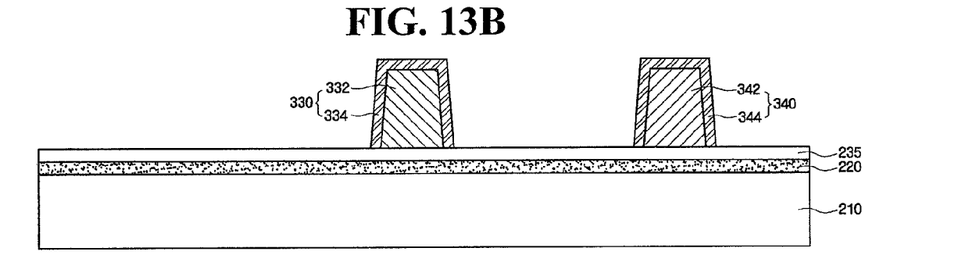

Referring to FIGS. 13A and 13B, the transparent conductive layer 240a is patterned to form an aperture 410 in a region where the cell-gap spacer 320 is to be formed. The transparent conductive layer 240a remains on the overcoat layer 235, which corresponds to pixel regions, to form the common electrode 240. Then, the transparent conductive layer 240a is removed except for portions covering the third support portion 332 and the fourth cover portion 342.

Referring to FIGS. 9A, 9B, 13A and 13B, the cell-gap spacer 320 is formed on a portion of the overcoat layer 235 which is exposed by the aperture 410. The cell-gap spacer 320 is formed by forming an organic insulating film or an inorganic insulating film on the whole surface of the overcoat layer 235 and performing a photolithography process and an etching process on the organic or inorganic film.

Figure 14A:
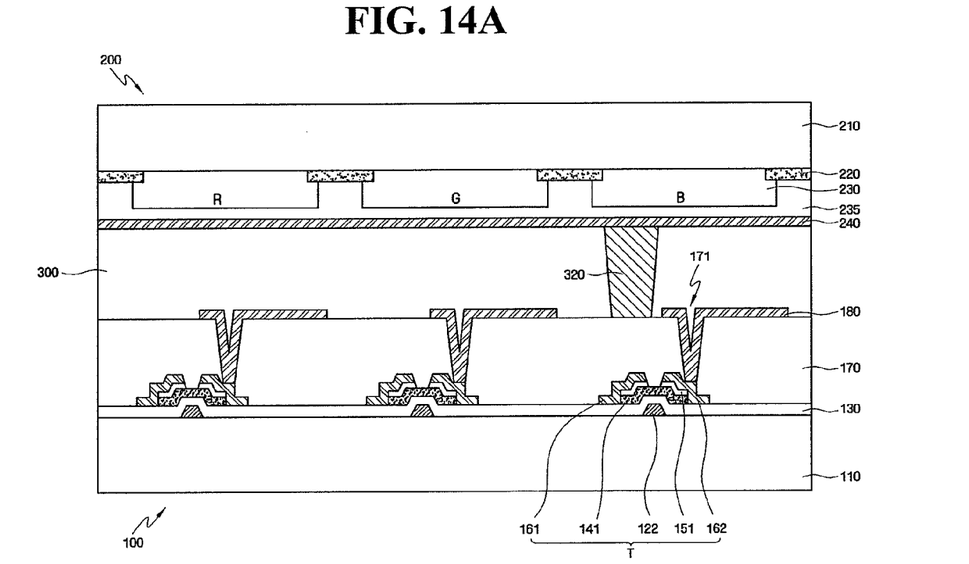
FIG. 14A is a cross-sectional view of a touch screen display according to an exemplary embodiment of the present invention.

A touch screen display according to an exemplary embodiment of the present invention is described with reference to FIGS. 14A and 14B. Referring to FIG. 14A, a conductive layer such as a common electrode 240 is formed between the overcoat layer 235 and the cell-gap spacer 320. Since the conductive layer is interposed between the overcoat layer 235 and the cell-gap spacer 320, the overcoat layer 235 can be prevented from being deformed when the touch pressure is applied. In an exemplary embodiment, a separate conductive layer, which is electrically insulated from the common electrode 240, may be interposed between the overcoat layer 235 and the cell-gap spacer 320. A diameter of the separate conductive layer may be greater than that of a surface of the cell-gap spacer 320, which faces and is adjacent to the separate conductive layer, by about 2 μm or more. In an exemplary embodiment, the diameter is greater than or equal to about 3 μm.

Figure 14B:
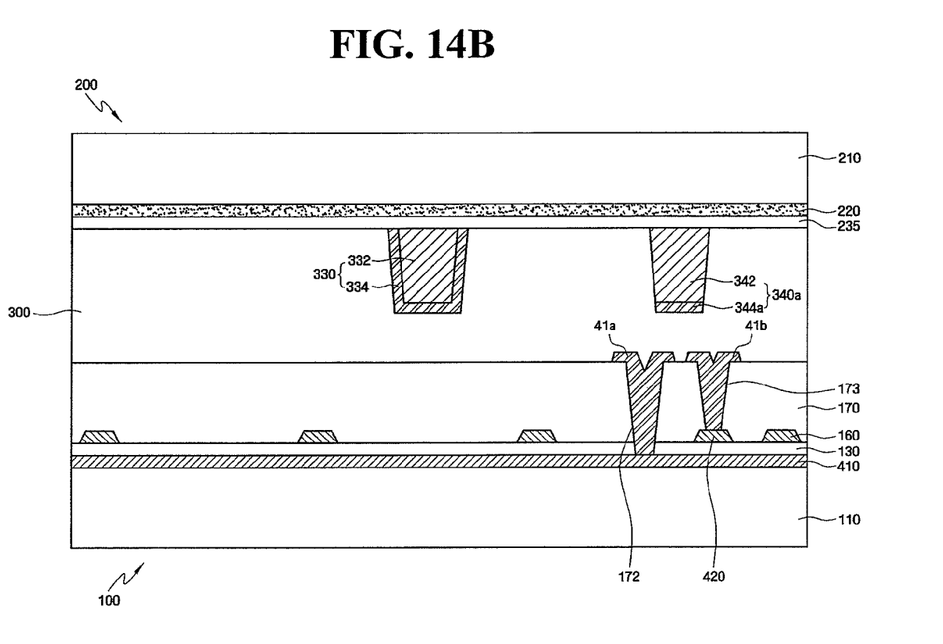
FIG. 14B is a cross-sectional view of a touch screen display according to an exemplary embodiment of the present invention.

Referring to FIG. 14B, a conductive spacer 340a includes a fourth support portion 342 and a conductive contact portion 344a which is formed on a top surface of the fourth support portion 342, that is, a surface of the fourth support portion 342 which faces first and second conductive pads 41a and 41b. When the conductive contact portion 344a is formed on the top surface of the fourth support portion 342 instead of completely covering the fourth support portion 342, the elasticity of the conductive spacer 340a can be increased.

Since the conductive contact portion 344a is formed on the fourth support portion 342, when the touch pressure is applied, the first and second conductive pads 41a and 41b may be electrically connected to each other by the conductive contact portion 344a.

Since the conductive contact portion 344a comprises a material having low elasticity, when side surfaces of the fourth support portion 342 are exposed, that is, not covered by the conductive contact portion 344a, the elasticity of the fourth support portion 342 can be increased. Therefore, even when the touch pressure is repeatedly applied, the deformation of the conductive spacer 340a can be reduced, which, in turn, increases the sensitivity and reliability of the touch screen display.

Although the exemplary embodiments of the present invention have been described herein with reference to the accompanying drawings, it is to be understood that the present invention should not be limited to those precise embodiments and that various other changes and modifications may be affected therein by one of ordinary skill in the related art without departing from the scope or spirit of the invention. All such changes and modifications are intended to be included within the scope of the invention as defined by the appended claims.

What is claimed is:

1. A touch screen display apparatus comprising:
    a first substrate and a second substrate facing each other;
    a conductive pad formed on the first substrate;
    a cell-gap spacer interposed between the first substrate and the second substrate;
    an auxiliary cell-gap spacer disposed around the cell-gap spacer; and
    a conductive spacer formed on the second substrate to correspond to the conductive pad, wherein the conductive spacer is movably connected to the conductive pad,
    wherein the auxiliary cell-gap spacer is covered by a conductive cover portion and does not contact the conductive pad,
    wherein the conductive spacer comprises a support portion formed on the second substrate and a conductive contact portion formed on the support portion, and
    wherein the conductive cover portion comprises substantially the same material as the conductive contact portion.

2. The touch screen display apparatus of claim 1, wherein a height of the auxiliary cell-gap spacer is less than that of the cell-gap spacer.

3. The touch screen display apparatus of claim 1, wherein the conductive cover portion comprises metal or metal oxide.

4. The touch screen display apparatus of claim 1, wherein the cell-gap spacer comprises a single layer.

5. The touch screen display apparatus of claim 4, wherein the auxiliary cell-gap spacer comprises:
    a support portion formed on the second substrate; and the conductive cover portion which completely covers the support portion of the auxiliary cell-gap spacer.

6. The touch screen display apparatus of claim 5, wherein the support portion of the auxiliary cell-gap spacer and the support portion of the conductive spacer comprise a same material and are formed simultaneously.

7. The touch screen display apparatus of claim 5, wherein the conductive contact portion completely covers the support portion of the conductive spacer.

8. The touch screen display apparatus of claim 5, wherein the conductive contact portion is formed on a top surface of the support portion of the conductive spacer.

9. The touch screen display apparatus of claim 1, wherein the cell-gap spacer comprises:
a first support portion formed on the second substrate; and
a second support portion formed on the first support portion.

10. The touch screen display apparatus of claim 9, wherein the auxiliary cell-gap spacer comprises:
a third support portion formed on the second substrate; and
the conductive cover portion which completely covers the third support portion.

11. The touch screen display apparatus of claim 10, wherein the second support portion and the third support portion comprise a same material and are formed simultaneously.

12. The touch screen display apparatus of claim 9, wherein the first support portion and the support portion of the conductive spacer comprise a same material and are formed simultaneously.

13. The touch screen display apparatus of claim 9, wherein the conductive contact portion completely covers the support portion of the conductive spacer.

14. The touch screen display apparatus of claim 9, wherein the conductive contact portion is formed on a top surface of the support portion of the conductive spacer.

15. A touch screen display apparatus comprising:
a first substrate and a second substrate facing each other;
a gate line and a first sensing line extending parallel to each other on the first substrate;
a data line and a second sensing line crossing the gate line and the first sensing line and extending parallel to each other;
a first conductive pad and a second conductive pad respectively connected to the first sensing line and the second sensing line;
a cell-gap spacer interposed between the first substrate and the second substrate;
an auxiliary cell-gap spacer formed on the second substrate; and
a conductive spacer formed on the second substrate to correspond to the first and second conductive pads, wherein the conductive spacer is movably connected to the first and second conductive pads,
wherein the auxiliary cell-gap spacer is covered by a conductive cover portion and does not contact the first conductive pad and the second conductive pad,
wherein the conductive spacer comprises a support portion formed on the second substrate and a conductive contact portion formed on the support portion and
wherein the conductive cover portion comprises substantially the same material as the conductive contact portion.

16. The touch screen apparatus of claim 15, wherein the auxiliary cell-gap spacer is shorter than the cell gap spacer.

17. The touch screen display apparatus of claim 16, wherein the cell-gap spacer comprises:
a first support portion formed on the second substrate; and
a second support portion formed on the first support portion.

18. The touch screen display apparatus of claim 17, wherein the auxiliary cell-gap spacer comprises:
a third support portion formed on the second substrate; and
the conductive cover portion which completely covers the third support portion.

19. The touch screen display apparatus of claim 16, wherein the cell-gap spacer comprises a single layer.

20. The touch screen display apparatus of claim 19, wherein the auxiliary cell-gap spacer comprises:
a support portion formed on the second substrate; and
the conductive cover portion which completely covers the support portion of the auxiliary cell-gap spacer.

* * * * *